(12) United States Patent
Goelles et al.

(10) Patent No.: US 7,656,583 B2
(45) Date of Patent: Feb. 2, 2010

(54) BEAM COMBINER EMPLOYING A WEDGE-SHAPED CROSS-SECTION

(75) Inventors: Michael Goelles, Jena (DE); Ralf Netz, Jena (DE); Marcus Heidkamp, Schonungen (DE); Joerg-Michael Funk, Jena (DE)

(73) Assignee: Carl Zeiss Microimaging GmbH, Jena (DE)

( * ) Notice: Subject to any disclaimer, the term of this patent is extended or adjusted under 35 U.S.C. 154(b) by 0 days.

(21) Appl. No.: 11/783,289

(22) Filed: Apr. 6, 2007

(65) Prior Publication Data

US 2008/0130125 A1 Jun. 5, 2008

(30) Foreign Application Priority Data

Jul. 28, 2006 (DE) .................. 10 2006 034 910

(51) Int. Cl.
*G02B 27/10* (2006.01)

(52) U.S. Cl. ...................... 359/618; 359/495

(58) Field of Classification Search .............. 359/618, 359/619, 629, 638, 368, 495, 873, 359, 360, 359/365, 837

See application file for complete search history.

(56) References Cited

U.S. PATENT DOCUMENTS

| | | | |
|---|---|---|---|
| 5,034,613 A | 7/1991 | Denk et al. | |
| 6,094,300 A | 7/2000 | Kashima et al. | |
| 6,159,749 A | 12/2000 | Liu | |
| 6,677,566 B2 | 1/2004 | Knebel et al. | |
| 7,075,650 B1 * | 7/2006 | Johs et al. | ............ 356/369 |
| 2004/0130681 A1 * | 7/2004 | Aastuen et al. | ............ 353/20 |
| 2006/0012864 A1 | 1/2006 | Funk et al. | |
| 2007/0159689 A1 | 7/2007 | Schau et al. | |

FOREIGN PATENT DOCUMENTS

DE 10 2004 016 433 A1 10/2005
DE 10 2004 034 987 A1 2/2006

OTHER PUBLICATIONS

H. L. Zhang et al; "Neurotrophin-Induced Transport of β-Actin Levels and Stimulates Growth Cone Mobility"; *Neuron*; Aug. 2, 2001; pp. 261-275; vol. 31; c. 2001; USA.
F. Umenishi et al; "cAMP Regulated Membrane Diffusion of a Green Fluorescent Protein-Aquaporin 2 Chimera"; *Biophysical Journal*; Feb. 2000; pp. 1024-1035; vol. 78; c. 2000;USA.
G. Gimpl et al; "Cholestrol and Steroid Hormones: Modulators of Oxytocin Receptor Function"; *Prog Brain Res.*; 2002; pp. 43-45; vol. 139.

* cited by examiner

*Primary Examiner*—Ricky L Mack
*Assistant Examiner*—Vipin M Patel
(74) *Attorney, Agent, or Firm*—Jacobson Holman PLLC (57) ABSTRACT

A beam corradiator for combining two radiation beams, preferably movable beams independent from each other in at least one direction, to scan and/or influence a sample, preferably a manipulation system and an imaging system, with a partially reflecting layer being provided for the corradiation, wherein the thickness of the layer is provided with a preferably consistent incline or decline over the optically effective cross-section of the beam corradiatior.

9 Claims, 5 Drawing Sheets

BEAM COMBINER EMPLOYING A WEDGE-SHAPED CROSS-SECTION

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO A SEQUENCE LISTING, A TABLE, OR A COMPUTER PROGRAM LISTING APPENDIX SUBMITTED ON A COMPACT DISC

Not Applicable.

BACKGROUND OF THE INVENTION

1. Field of the Invention

The present invention relates to beam combiners, in general, and to a beam combiner of a specific configuration, in particular.

2. Description of Related Art

Confocal laser microscopy is a tool for the defined addressing of microscopic objects. This method sets very high requirements for the confocal laser microscopy is a tool for the defined addressing of microscopic objects. This method sets very high requirements to the imaging performance of the optic system, which typically is close to the deflection-limited resolution capability. Based on confocal laser scanning microscopy a multitude of methods for examining and influencing microscopic objects has been suggested, such as e.g., Denk in U.S. Pat. No. 5,034,613, TPA, Liu in U.S. Pat. No. 6,159,749, for "Highly Sensitive Bead-Based Multi-Analyte Assay System Using Optical Tweezers", or Karl Otto Greulich in "Micromanipulation by Light in Biology and Medicine" 1999. The combination of an imaging point and/or line scanning system and a manipulator system form the core of such arrangements. Interest in the observation and analysis of fast microscopic processes creates new devices and methods, e.g., ZEISS line scanner LSM 5 LIVE], with its combination with the above-mentioned manipulation methods leading to new insights. Of particular interest is the simultaneous manipulation and observation of microscopic processes (U.S. Pat. No. 6,094,300 and DE 102004034987A1). Therefore modern microscopes attempt to offer as high a number of flexible coupling and decoupling sites as possible (DE 102004016433A1, for "Tube-Type Revolver With At Least Four Positions For Injecting Or Extracting Light Into Or From A Laser Scanning Microscope"). The simultaneous availability of at least two coupling sites for independent scanning systems is particularly important, here, in order to avoid limitations in the temporal resolution based on slow mechanical switching processes. In addition to the tube interface additional coupling sites are possible at the sides of the support of the microscope (preferably in an expanded infinite space: "Sideports") as well as at the back of the support ("rearports") as well as at the bottom ("baseports").

In principle, arrangements with a common irradiation direction (either top light or passing light) or opposite irradiation directions (top light and passing light) are possible. In addition to an applicative background, frequently the common irradiation direction is preferred for device-technological reasons.

Figure 1:
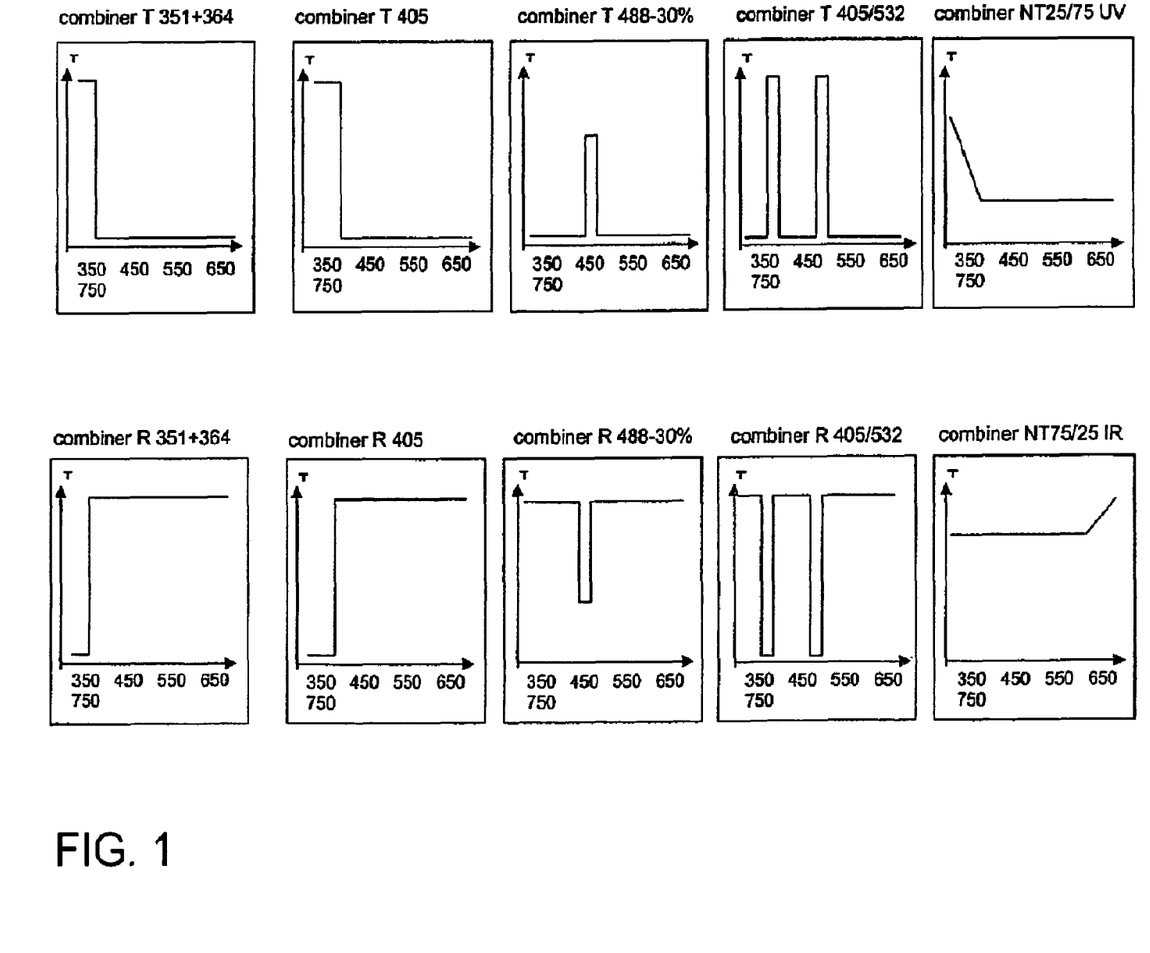
FIG. 1 shows graphs of the transmission T for a selection of potential combiner types with the manipulation wavelengths 355 nm, 405 nm, 488 and 532 nm being used both in the transmission and the reflection direction.

In this case, the use of at least one element is necessary, which combines the incoming beams of both devices in the space between the scanners of the simultaneously operating scan systems and the lens, in order to ensure the greatest system flexibility, in the support connection of the scan modules but also in the wavelengths and the polarization of the combined lasers. Both for the manipulation as well as the imaging system the spectral range of use can generally span from the ultraviolet to the infrared spectrum. Typically applied wavelengths for manipulation are e.g., 351, 355, and 364 nm (photo-uncaging), 405 nm (Photo conversion, Kaede, Dronpa, PA-GFP), 488 and 532 nm (photo bleaching, FRET, FRAP, FLIP) as well as 780-900 nm (multi-photon-bleaching e.g., MPFRAP, 2-photon uncaging, direct multiphoton simulation). Depending on the combined wavelengths as well as the coupling sites of the imaging and manipulating system numerous types of dichroic combiners result for useful applications. FIG. 1 shows graphs of the transmission T for a selection of potential combiner types with the manipulation wavelengths 355 nm, 405 nm, 488 and 532 nm being used both in the transmission and the reflection direction. Neutral combiners (e.g., T20/R80) are here universally used for various applications and additionally allow in a simple manner applications, in which both for the imaging system as well as for the manipulating system the same laser wavelength is used (in particular FRAP). Typically a motorized switching device is provided for the various beam combiner types, such as e.g., a motorized reflector revolver in the area of the infinite space between the lens and the tube lens.

In practical application, numerous requirements must be fulfilled by the described beam combiner element, which are to be considered when the element is designed, and which are not discussed in U.S. Pat. No. 6,677,566 B2.

Typical problems of such combiners are the potential occurrence of interferences with identical incline, the protection of the image quality, and the overlapping of the two beam paths.

First, it must be ensured that the beam combiner element does not interfere with the imaging performance of the laser scanning microscope. For example, the fitting requirements of the beam irradiator element are to be selected such that no astigmatism develops.

Figure 2A:
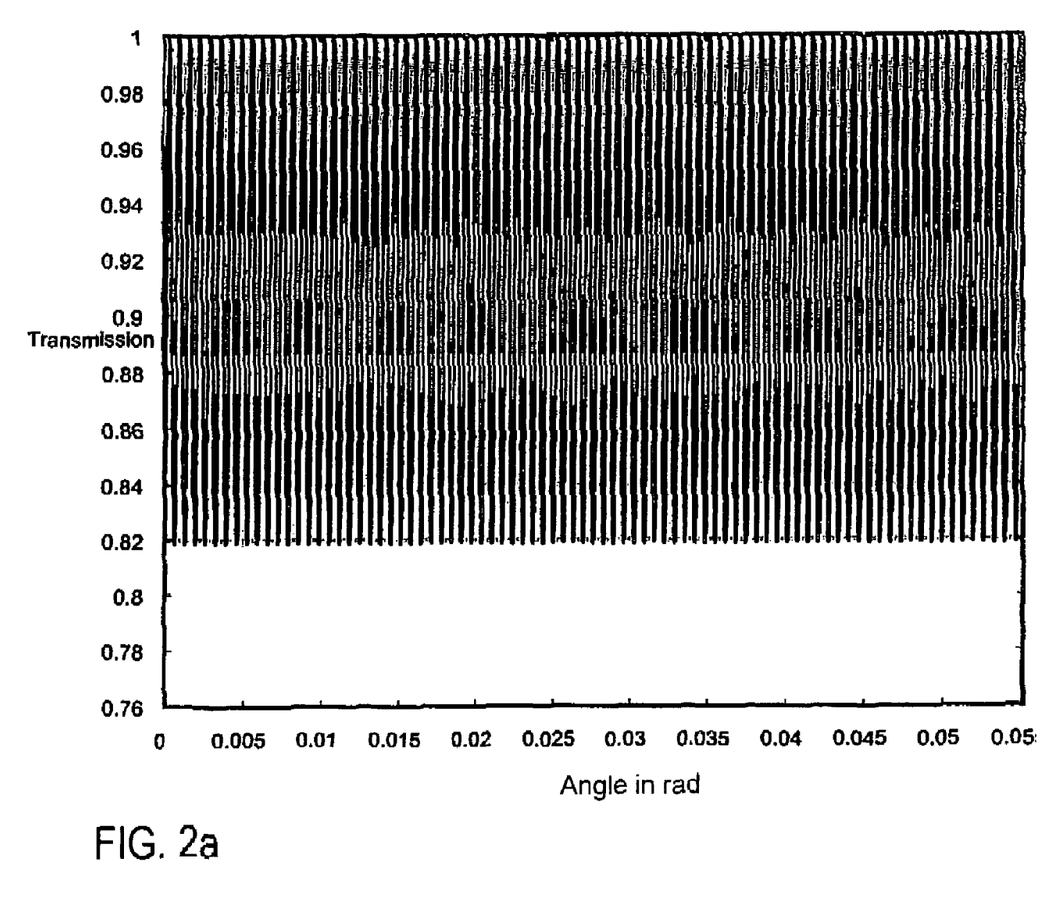
FIGS. 2a and 2b are graphical illustrations of typical consequences of reflections on the transmission T of a plane-parallel beam combiner.
Figure 2B:
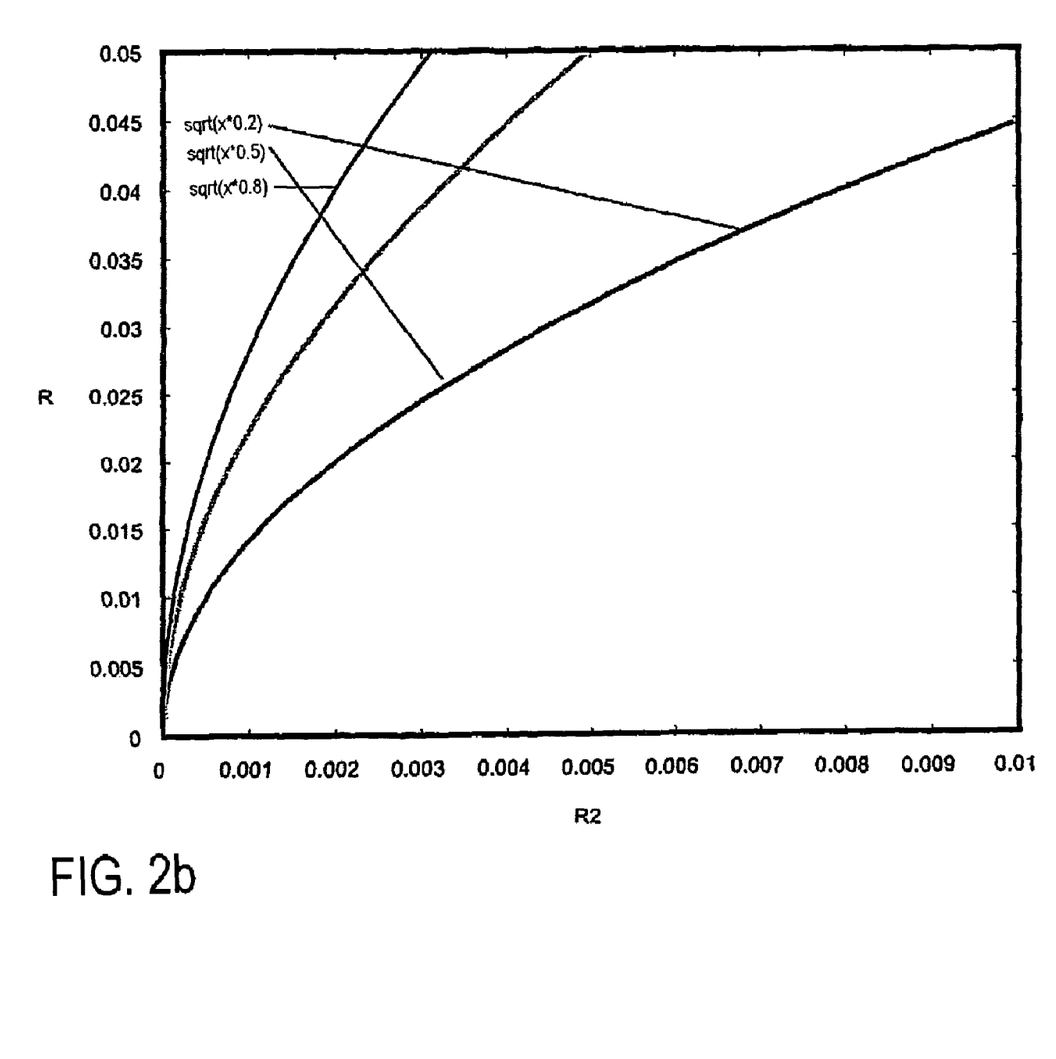

Due to the limited reflection coefficient at the front and back of a plane-parallel beam combiner, as a result of the reflections, interferences with the same incline may occur, which lead in the focal level of the microscopic lens to a modulation of the amplitude of the exciting light. Typical consequences on the transmission T are therefore $$T = \frac{1}{1 + m\sin^2\left(2\pi\frac{d}{\lambda}\sqrt{n^2 - \sin^2\alpha}\right)}$$

as shown in FIGS. 2a and 2b, with the modulation m=4R/(1−R) being connected to the geometric median of the reflection coefficient $R^2 = R_1 R_2$, λ representing the wavelength, d the thickness, and n the refractive index of the combiner. α represents the angle, at which the splitter is hit and ranges typically up to 0.055 for the field-of-view number 18. The combining element is located in a beam path range, in which during the scanning process (imaging or sample manipulation) the angle of incidence α constantly changes.

Accordingly, the interferences of identical inclines occurring at the plane-parallel combiner lead to a periodic amplitude modulation of the incoming light intensity in the fieldof-vision. In practice, this leads to disturbing lines in the imaging system and/or in a linearly varying manipulation efficiency. The reflectivities $R_1$ and $R_2$ depend both on the wavelength (in particular dichronic combiners) as well as the polarization of the laser radiation shining in from, with the latter also being predetermined by the original polarization of the scanning module and its assembly position at the support. With an increasing wavelength the interference lines occurring in the image become larger and their modulation depth becomes greater. In this dielectric combiner, the direction of polarization primarily influences the effects of the anti-reflective (AR) coating. Due to the fact that the combiner is positioned at 45° in the radiation path, which is near the Brewsterangle for glass, the p-component is naturally reflected to a lesser extent than the s-component. In order to achieve modulation below m=0.04 R=0.01 must be realized, which leads to various partial ratios $R_1$ to $R_2$<0.001. Practically such blooming cannot be achieved by the sometimes large spectral range (cf. FIG. 1) for technical reasons even under p-polarization. In practice, it is therefore not possible to avoid the disturbing interference lines simply by optimizing the anti-reflective coating of the combiner.

A potential solution would be a software-based filtering of the measured signals. Due to the fact that combiners regularly create interference lines, the method of the Fourier-filtering is particularly obvious, here. However, software-based filter methods are known to produce a spatial loss in resolution and thus are not acceptable for the application, here.

SUMMARY OF THE INVENTION

The problems of the prior art are solved in accordance with the present invention by the introduction of a combiner with a defined wedge angle.

Because the reverse reflection occurring at the beam combiner must be distinctly outside an Airy-diameter so that a mutual interference in the object level (and thus an interference) is excluded, the wedge angle is $\alpha > 1.22 \, \alpha/NA'/164.5$ mm/3.74. It is preferable to align the wedge direction shifted by 45° with reference to the illumination axes.

BRIEF DESCRIPTION OF THE SEVERAL VIEWS OF THE DRAWINGS

The invention is better understood by reading the following Detailed Description of the Preferred Embodiments with reference to the accompanying drawing figures, in which like reference numerals refer to like elements throughout, and in which.

DETAILED DESCRIPTION OF THE INVENTION

The introduction of a combiner with a defined wedge angle solves the problem of interferences occurring in a plane-parallel beam combiner with the same incline and the amplitude modulation of the excitation and manipulation light in the focal level of the lens connected thereto. Here, it must be observed that the reverse reflection occurring at such a beam combiner:

1. is distinctly outside an Airy-diameter so that a mutual interference in the object level (and thus an interference) is excluded;
2. in its intensity is so low that a "ghost image" is practically undetectable; and
3. in a line scanner (e.g., LSM 5 LIVE/ZEISS) no parallel displacement of the radiation lines onto themselves takes place (which again were to lead to interferences).

Furthermore, the fitting requirements of the beam combiner are to be selected such that the imaging performance of the microscopic system remains near the resolution capacity limited by the deflection.

Requirement 1 (above) leads to a wedge angle $\alpha > 1.22 \, \alpha/NA'/164.5$ mm/3.74.

Therefore objects with a small image-side aperture determine the minimum wedge angle. Typically an effective wedge of approximately 0.7° will be sufficient.

Figure 3A:
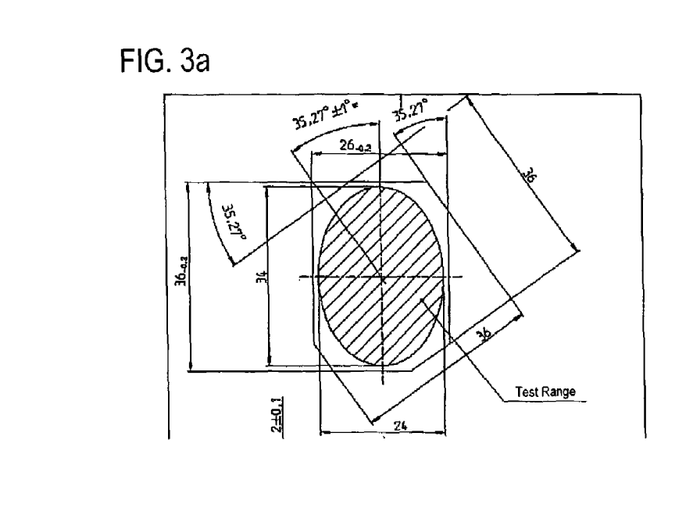
FIGS. 3a and 3b are graphical illustrations explaining a geometry of a beam combiner in accordance with the present invention.
Figure 3B:
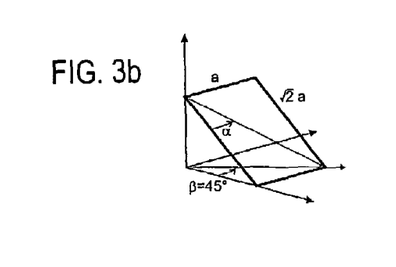

With regard to the wedge angle, it must be mentioned that due to numerous combinations of support connections and scanning systems it is particularly advantageous to align the wedge direction shifted by 45° with reference to the axes. FIGS. 3a and b explain this geometry. Due to the fact that the beam combiner is aligned at 45° in reference to the radiation direction, the projection to the primary axis must be observed. Here, a wedge direction results of $$\alpha = \tan^{-1} \frac{1}{\sqrt{2}} = 35,26°$$

with regard to the edge of the beam combiner (shown in FIG. 3b) and the wedge angle is to be increased by a factor of $\sqrt{2}$.

The geometry shown in FIGS. 3a and 3b is particularly advantageous when a line scanner is used as the imaging system. The wedge direction is then diagonal (i.e. 45°) in reference to the two possible primary axes of the scanning line (parallel to the edges of the combiner) so that independent from the coupling position of the line scanner at the support the reflection occurring at the combiner wedge leads to no parallel line displaced onto itself. The combiner geometry shown in FIGS. 3a and 3b therefore allows an effective avoidance of the described interference lines in a line scanner in any possible support connections.

Figure 4:
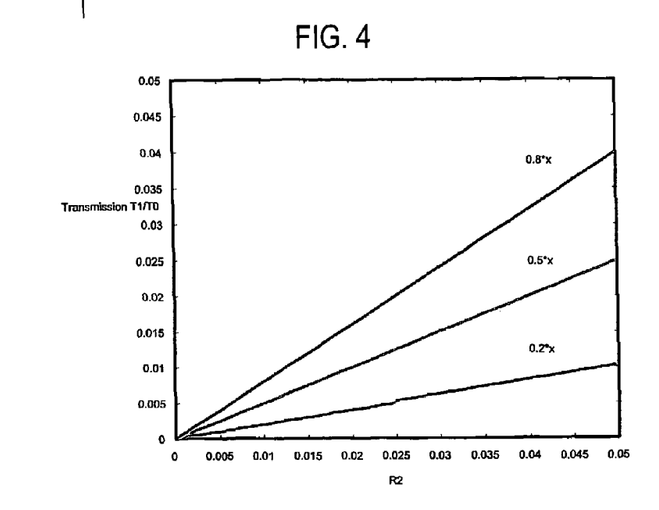
FIG. 4 graphically illustrates the anti-reflection features of a combiner wedge incorporating the subject invention.

In a large wedge angle of the beam combiner and bad AR-coating the beam combiner wedge causes "ghost images." FIG. 4 shows the necessary anti-reflection features of a combiner wedge necessary for a certain ratio of used signal and $1^{st}$ reflex being approximately 0.7°. The practically non-disturbing size of $T_1/T_0$=0.01 then results in $R_2$>0.01, which is technologically easily controlled for both polarization components s and p. In contrast to a plane-parallel beam combiner substrate a wedge-shaped beam combiner geometry allows an efficient prevention of ghost images and interference lines with AR coatings having a reflection capability of $R_2$=1%. Due to the fact that these requirements can be realized for both polarization components without any problems, the same combiner wedges can be used for any arbitrary polarization condition of the incidental laser radiation. The defined wedge angle therefore allows the use of the same beam combiner type for different assembly positions of the scanning module at the support of the microscope.

Figure 5A:
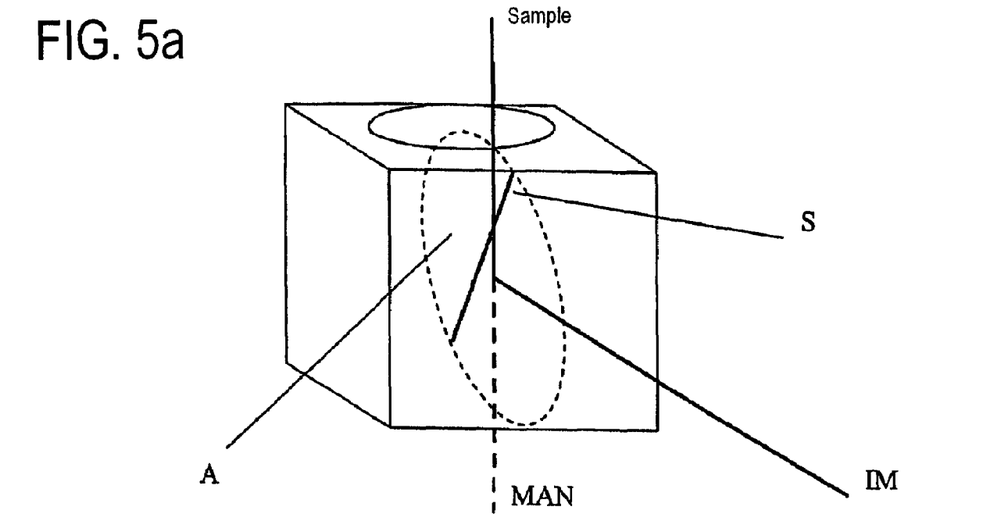
FIG. 5a is a three-dimensional schematic diagram of a beam splitter used to explain the subject invention.

In FIG. 5a, a beam splitter is shown three-dimensionally, as for example arranged in a motorized beam splitter relay. A is the splitter area arranged preferably at a 45 degree angle in reference to the optical axis of the incoming light.

Here, the beam path of the inverse microscope is shown schematically, i.e. the sample is lit from below.

A beam path "MAN" of a manipulating radiation unit, coming for example from below, passes the beam splitter in transmission and is combined via a splitter area A with the radiation path "IM" of an imaging unit (reflection at the combiner), thus allowing both beams to impinge the sample from the same direction.

Figure 5B:
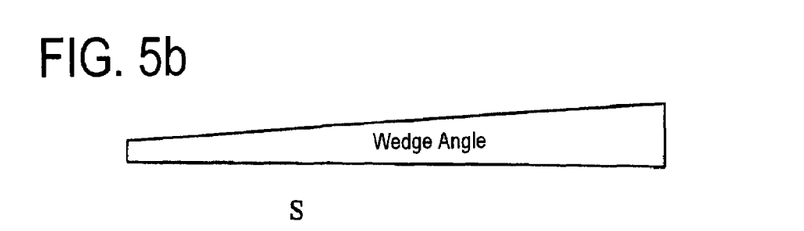
FIG. 5b is an enlarged plan view along the line S in FIG. 5a with regard to the wedge angle.

In FIG. 5b, a highly enlarged cross-section along the line S in FIG. 5a is shown with regard to the wedge angle, in order to illustrate the wedge angle of the splitter area.

An incline and/or decline of the cross-section (i.e., the wedge direction) occurs advantageously at an angle different from zero degree in reference to the plane spanned by the beams "MAN" and "IM" (cf. FIG. 5a)).

The described solution has the advantage that it has no essential influence on the imaging characteristics (pupil illumination, color profile) of the passing light, even in substrates of 2 mm thickness. Therefore, no disturbing aberrations and image artifacts occur when using beam combiners with a wedge-shaped geometry.

Additional solutions with thick substrates and large wedge errors are possible. They offer good stability and are technologically easily controlled, however they require a separate correction of the passing beam path.

Generally, the described beam combiners can be used with a defined wedge angle to combine the beam paths of arbitrary imaging and manipulating systems. In addition to (confocal) point and line scanners, here particularly multi-focal laser scanning systems may be used (e.g. based on lens arrays, diode laser arrays, arbitrary beam splitter arrangements) and spinning disk systems/Nipkow systems. Furthermore, an advantageous use of the described wedge-shaped beam combiners is possible in simultaneous sample manipulation and/or imaging with the help of (structured) wide-angle illumination systems, in particular when they are provided with coherent light sources (lasers).

The described invention relates, among other things, to the following applicative aspects:

- development of organisms: analysis of living cells in a 3D-environment (in particular a 3D-tissue web) with markings and pharmaceuticals, which are in a targeted fashion
- bleached by laser illumination (e.g., FRET experiments)
- bleached by laser illumination and simultaneous observation outside ROI (e.g. FRAP and FLIP experiments in 3D)
- show changes by laser illumination caused by manipulations (e.g., activation and/or uncaging transmitters in 3D)
- show color changes by laser illumination caused by manipulation (e.g., paGFP, Dronpa, Kaede).
- cellular internal transportation processes, with their dynamic (usually in the range of hundredths of seconds) being examined, frequently by methods such as FRAP using ROI bleaching.

Examples for such studies are described here, for example:

Umenishi, F. et al. 2000 in Biophys. J. 78:1024-1035 describe an analysis of the spatial mobility of aquaporin in GFP-transfiscated cultured cells. For this purpose, spots in the cell membrane were bleached in a locally targeted fashion and the diffusion of the fluorescence in the environment was analyzed.

Gimpl, G. et al. 2002 in Prog. Brain Red., 139:43-55 describe experiments with ROI bleaching and fluorescence imaging for analyzing the mobility and distribution of GFP-marked oxytoxin receptors in fibroblasts. Here, high requirements are set for the spatial positioning and resolution as well as the direct temporal sequence of bleaching and imaging.

Zhang et al. 2001 in Neuron, 31:261-275 describe live cell imaging of GFP-transfiscated nerve cells, with the movement of granuli being analyzed by combined bleaching and fluorescence imaging. The dynamics of the nerve cells set high requirements to the speed of imaging, here.

Interaction of Molecules:

The described invention is particularly suitable for the imaging of molecular and other sub-cellular interactions. Here, very small structures must be imaged with at high speed (in the range of hundredths of seconds). In order to resolve the necessary spatial position of the molecules for interaction, indirect techniques, such as FRET are to be used with ROI bleaches.

Signal Transmission Between Lines:

Activation and/or release (uncaging) of transmitters and/or direct cell simulation by laser radiation.

The invention claimed is:

1. A laser scanning microscope including:
   a beam combiner for combining two incoming illumination beams, for at least one of influencing and scanning a sample, wherein the two incoming illumination beams are moved independently of each other in at least one direction to span a plane, and wherein:
   the beam combiner has a partially reflecting layer of a predetermined thickness for beam combination, and an optically effective cross-section, wherein the thickness of the partially reflecting layer has one of a consistent incline and decline over the optically effective cross-section of the beam combiner, and
   the partially reflecting layer has a wedge-shaped cross-section with a wedge direction having a non-zero degree angle to the plane spanned by the incoming illumination beams.

2. The laser scanning microscope according to claim 1, wherein the beam combiner has cubic exterior edges and the wedge direction extends in the direction of the cubic edges.

3. The laser scanning microscope according to claim 1, with the wedge direction being diagonal with reference to the plane spanned by the incoming illumination beams.

4. The laser scanning microscope according to claim 1, wherein the microscope is one of a point scanning and a line scanning microscope.

5. The laser scanning microscope according to claim 1, wherein the use in sample manipulation and/or imaging with the help of wide-angle illumination systems, in particular coherent light sources.

6. The laser scanning microscope of claim 1, wherein the wedge direction is at approximately 45 degrees with reference to the plane spanned by the incoming illumination beams.

7. The laser scanning microscope of claim 1, wherein the wedge direction is at an angle of about 35 degrees with respect to the edge of the beam combiner.

8. A laser scanning microscope including:
- a manipulating system,
- an imaging system, and
- a beam combiner for combining two incoming illumination beams movable independently of each other in at least one direction, for at least one of influencing and scanning a sample, wherein:
    - the beam combiner has a partially reflecting layer for beam combination, and an optically effective cross-section, wherein the thickness of the partially reflecting layer has one of a consistent incline or decline over the optically effective cross-section of the beam combiner, and
    - the partially reflecting layer has a wedge-shaped cross-section with a wedge direction having a non-zero degree angle to the plane spanned by the incoming illumination beams.

9. The laser scanning microscope of claim 8, wherein the wedge direction is at an angle of about 35 degrees with respect to the edge of the beam combiner.

* * * * *

UNITED STATES PATENT AND TRADEMARK OFFICE
CERTIFICATE OF CORRECTION

| | | |
|---|---|---|
| PATENT NO. | : 7,656,583 B2 | Page 1 of 1 |
| APPLICATION NO. | : 11/783289 | |
| DATED | : February 2, 2010 | |
| INVENTOR(S) | : Goelles et al. | |

It is certified that error appears in the above-identified patent and that said Letters Patent is hereby corrected as shown below:

Title page, item [73] assignee, change "Microimaging"

to --MicroImaging--

Signed and Sealed this

Twenty-first Day of September, 2010

David J. Kappos
*Director of the United States Patent and Trademark Office*